April 7, 1959
C. K. FOCHT ET AL
2,880,820
COMPOSITE VALVE STRUCTURE
Filed May 10, 1956
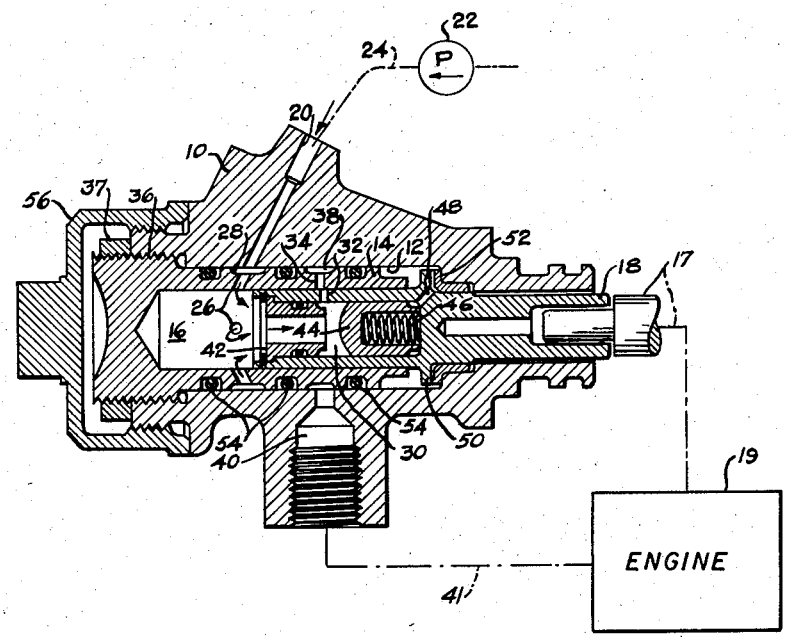
INVENTORS
CLAUDE K. FOCHT
CONWAY H. MELCHER
BY
ATTORNEY A# United States Patent Office 2,880,820
Patented Apr. 7, 1959

2,880,820

COMPOSITE VALVE STRUCTURE

Claude K. Focht, Rochelle Park, and Conway H. Melcher, Paramus, N.J., assignors to Curtiss-Wright Corporation, a corporation of Delaware Application May 10, 1956, Serial No. 584,055

2 Claims. (Cl. 184—6)

The invention relates to valve structures and is particularly directed to valve structures for controlling the flow of lubricating oil to a bearing of an engine or other mechanism.

It is known to meter the quantity of lubricating oil fed to a bearing of an engine or other mechanism by periodically supplying a small quantity of oil to the bearing. It is also known to provide a check valve in the oil supply line to a bearing to prevent drainage of oil from the bearing when the engine or other mechanism is shut down.

An object of the present invention comprises the provision of a novel, simple and compact valve structure for periodically feeding small quantities of a fluid, for example lubricating oil, in combination with a check valve for preventing reverse flow.

Other objects of the invention will become apparent upon reading the annexed detailed description in connection with the drawing which is an axial sectional view through a valve structure embodying the invention.

The invention is described in connection with a lubricating oil control valve structure. As will be apparent however the invention can also be used for controlling other fluids.

Referring to the drawing, reference numeral 10 designates a housing for a valve structure designed to control the supply of lubricating oil to a bearing of an engine. The housing 10 has a bore 12 therethrough and a sleeve 14 is positioned in said bore. The sleeve has a closed end 16 and a shaft 18 extends into the other and open end of the sleeve. The shaft 18 is drivably connected at its outer end to a shaft 17 driven from an engine schematically indicated at 19.

The housing 10 has an inlet passage 20 to which lubricating oil is supplied under pressure by a pump 22 via a conduit 24. The sleeve 14 has a plurality of radial holes 26 therethrough. The inner ends of the holes 26 open into the sleeve adjacent its closed or bottom end 16 and the outer ends of said holes 26 open into an annular external groove 28 in the sleeve 14, said groove communicating with the inner end of the passage 20 whereby lubricating oil is supplied therethrough to the closed end of the sleeve 14.

The end portion of the shaft 18 disposed within the sleeve 14 has a hollow open-ended construction in the form of a co-axial bore 30 in said shaft end which opens into the closed end of said sleeve. A radial hole 32 extends through the wall of the shaft bore 30 so that as the shaft 18 rotates the hole 32 communicates, once each revolution, with a radial hole 34 through the sleeve 14. The sleeve 14 is adjustably secured in position within the housing 10 by a threaded connection 36 so that the axial position of the sleeve hole 32 can be varied by rotatively adjusting the sleeve. With this construction the degree of overlap of the shaft and sleeve holes 32 and 34 can be adjusted as desired. A lock nut 37 is provided to hold the sleeve in any desired position of adjustment.

The sleeve 14 has an external annular groove 38 into which the sleeve hole 34 opens. In addition the housing 10 has an outlet passage 40. The inner end of the passage 40 communicates with the groove 38 while the outer end of said passage is arranged for connection by means schematically indicated at 41 to the bearing to which lubricating oil is to be supplied by the structure described.

With the structure so far described, the shaft 32 and sleeve hole 34 communicate with each other once each revolution of the shaft 10 and for only a short time during each revolution. When the holes 32 and 34 are in communication lubricating oil is supplied from the inlet passage 20 through annulus 28, holes 26 to the closed end of the sleeve 14 and thence into the shaft bore 30 and through the holes 32 and 34 and groove 38 to the outlet passage 40. In this way, the shaft and sleeve holes 32 and 34 constitute a metering valve arrangement such that as the shaft 18 rotates a small quantity of lubricating oil is periodically delivered to the bearing once each revolution of the shaft. The magnitude of this periodic quantity of oil can be varied by adjusting the degree of overlap of the shaft and sleeve holes 32 and 34 as described.

When the engine or other mechanism to be lubricated is shut down and the pump 22 is also shut down it is desired to prevent oil from draining back from the bearing through the passage 40. For this purpose an annular valve seat 42 is secured in the shaft bore 30 adjacent the open end of said bore and a check valve 44 is slidably fitted within said shaft bore. A light spring 46, behind the check valve 44, urges said valve toward the valve seat 42 against the pressure of the lubricating oil supplied by the pump 22. The spring 46 is designed so that the check valve 44 is opened by the oil pressure acting against the end face of the check valve well before full pressure is supplied by the pump 22 and does not close against the adjacent end of the valve seat 42 until the oil pressure is substantially shut off.

With the addition of the check valve 42, when operation of the pump 22 is initiated the check valve 42 promptly opens whereupon, as previously described, rotation of the shaft 18 is effective to cause lubricating oil to be fed intermittently, once each shaft revolution, to the bearing to be lubricated. When the pump 22 is shut down, the check valve 42 closes to prevent drainage of oil back from the bearing through the passage 40.

The location of the check valve 42 within the shaft 18 provides a compact arrangement. In addition with the check valve 42 disposed within the shaft 18 the vibration normally accompanying rotation of the shaft will minimize the possibility of the check valve 42 sticking in any position.

The back side of the check valve 42 is vented by a passage 48 to the outside of the shaft 18 from which lubricating oil can escape along the shaft past a loose fitting bushing 48. The shaft 18 has a shoulder 50 which in operation is held against a shoulder 52 in the housing bore 12 by the pressure of the lubricating oil against the end of the shaft within the sleeve 14. Suitable seals 54 are provided between the sleeve 14 and the housing bore 12 to minimize leakage from the sleeve grooves 28 and 38. Also, a cap 56 is secured to the housing 10 over the threaded end of the sleeve 14.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with an engine; apparatus for periodically supplying a quantity of lubricating oil to said engine, said apparatus comprising a housing having a cylindrical bore and having an inlet passage for the supply of lubricating oil under pressure thereto and an outlet passage for the supply of lubricating oil therefrom to said engine; a shaft rotatably fitted within said bore and having means for providing a rotative driving connection with said engine for continuously driving said shaft during engine operation; said shaft having a hollow portion arranged for communication with one of said housing passages and having a hole through a wall of its hollow portion arranged to communicate periodically with the other of said housing passages as said shaft rotates so that lubricating oil is supplied periodically from said inlet passage through said hole to said outlet passage and thence to said engine; a check valve rotatable with and disposed within the hollow portion of said shaft in the oil flow path from said inlet passage to said outlet passage so that the pressure of the oil supplied to said inlet passage urges said valve to its open position and, when open, said valve permits oil flow through said path from said inlet passage to said outlet passage each time said shaft hole communicates with said other passage; and means for moving said check valve toward its closed position for closing said flow path when the supply of oil under pressure to said inlet passage is shut off.

2. Apparatus for periodically supplying a quantity of lubricating oil to an engine; said apparatus comprising a housing having an inlet passage for the supply of lubricating oil under pressure thereto and an outlet passage for the supply of lubricating oil therefrom; a sleeve fitted within said housing and having a hole through a wall of said sleeve communicating with said outlet passage; a shaft rotatably fitted within said sleeve and having means for providing a rotative driving connection thereto for providing said shaft with a continuous drive; said shaft having a hollow portion arranged for communication with said inlet passage and having a hole through a wall of its hollow portion arranged to overlap and communicate with said sleeve hole periodically as said shaft rotates for flow of lubricating oil from said inlet passage outwardly through said holes to said outlet passage; a check valve rotatable with and disposed within the hollow portion of said shaft in the flow path from said inlet passage to send outlet passage so that the pressure of the oil supplied to said inlet passage urges said valve to its open position and, when open, said valve permits oil flow through said path from said inlet passage to said outlet passage each time said shaft and sleeve holes communicate with each other; spring means for moving said check valve to its closed position for closing said flow path when the supply of fluid under pressure to said inlet passage is shut off; and means for adjusting the axial position of said sleeve for varying the extent to which said sleeve and shaft holes are arranged to overlap each other.

References Cited in the file of this patent

UNITED STATES PATENTS

| | | |
|---|---|---|
| 2,223,590 | Alden | Dec. 3, 1940 |
| 2,304,784 | Donaldson | Dec. 15, 1942 |
| 2,319,574 | Adney | May 18, 1943 |
| 2,494,183 | Lincoln | Jan. 10, 1950 |
| 2,742,918 | Irving | Apr. 24, 1956 |
| 2,750,929 | Bronson | June 19, 1956 |
| 2,754,814 | Hopwood | July 17, 1956 |
| 2,797,770 | Burrell | July 2, 1957 |